US012699523B2

(12) United States Patent
Han et al.

(10) Patent No.: US 12,699,523 B2
(45) Date of Patent: Aug. 4, 2026

(54) SYSTEM AND METHOD FOR REBALANCING DATA AFTER STORAGE POOL EXPANSION

(71) Applicant: Dell Products L.P., Round Rock, TX (US)

(72) Inventors: Geng Han, Beijing (CN); Vamsi K. Vankamamidi, Hopkinton, MA (US); Baote Zhuo, Beijing (CN)

(73) Assignee: Dell Products L.P., Round Rock, TX (US)

( * ) Notice: Subject to any disclaimer, the term of this patent is extended or adjusted under 35 U.S.C. 154(b) by 2 days.

(21) Appl. No.: 19/041,223

(22) Filed: Jan. 30, 2025

(65) Prior Publication Data

US 2026/0219799 A1 Jul. 30, 2026

(51) Int. Cl.
*G06F 3/06* (2006.01)

(52) U.S. Cl.
CPC .......... *G06F 3/0647* (2013.01); *G06F 3/0604* (2013.01); *G06F 3/0689* (2013.01)

(58) Field of Classification Search
CPC ..... G06F 3/0647; G06F 3/0604; G06F 3/0689
See application file for complete search history.

(56) References Cited

U.S. PATENT DOCUMENTS

| | | | | |
|---|---|---|---|---|
| 11,726,684 B1* | 8/2023 | Sangle | .................. | G06F 3/0604 |
| | | | | 711/171 |
| 2019/0129614 A1* | 5/2019 | Dalmatov | ............. | G06F 3/0689 |
| 2019/0220231 A1* | 7/2019 | Xu | ......................... | G06F 3/0604 |
| 2021/0103399 A1* | 4/2021 | Lyu | ....................... | G06F 3/0673 |
| 2021/0132845 A1* | 5/2021 | Shang | .................... | G06F 3/0607 |
| 2022/0129174 A1* | 4/2022 | Kang | .................... | G06F 3/0689 |
| 2023/0018707 A1* | 1/2023 | More | ...................... | G06F 3/064 |
| 2024/0086287 A1* | 3/2024 | Kocol | .................... | G06F 3/0617 |

* cited by examiner

*Primary Examiner* — Sean D Rossiter
(74) *Attorney, Agent, or Firm* — Brian J. Colandreo; Heath M. Sargeant; Holland & Knight LLP

(57) ABSTRACT

A method, computer program product, and computing system for detecting the addition of a new storage device to a storage pool. A rebalancing target is generated for the storage pool by simulating an initial layout of used data slices and reserved data slices into a plurality of data slice stripes. It is determined whether the plurality of storage devices of the storage pool meet the rebalancing target. In response to determining that the plurality of storage devices do not meet the rebalancing target, a source storage device is selected for restriping. A destination storage device is selected for restriping. One or more data slices from the source storage device are transferred to the destination storage device. The selecting of source storage devices, destination storage devices, and transferring of data slices are iteratively repeated until the plurality of storage devices meet the rebalancing target.

20 Claims, 9 Drawing Sheets

10

SYSTEM AND METHOD FOR REBALANCING DATA AFTER STORAGE POOL EXPANSION

BACKGROUND

Storing and safeguarding electronic content may be beneficial in modern business and elsewhere. Accordingly, various methodologies may be employed to protect and distribute such electronic content.

For example, storage devices can be combined to form a storage pool for protecting data during data access and storage device failure. For example, each storage device includes a plurality of data slices. Data slices from multiple storage devices are combined to form data slice stripes that spread data across the storage pool. When a storage device is added to a storage pool, the data slices are rebalanced. The goal of the rebalancing process is to transfer data slices from existing storage devices to new storage devices until the number of used data slices on each storage devices matches the number achieved at the end of an initial data slice stripe layout, using the same amount of data slice stripes in the post-expansion configuration. However, with varying sized storage devices, conventional rebalancing approaches are generally unable to provide storage pool expansion without compromising useable capacity and reserved space for restoring failed storage devices.

SUMMARY OF DISCLOSURE

In one example implementation, a computer-implemented method executed on a computing device may include, but is not limited to, detecting the addition of a new storage device to a storage pool. A rebalancing target is generated for the storage pool including the new storage device by simulating an initial layout of used data slices and reserved data slices into a plurality of data slice stripes. It is determined whether the plurality of storage devices of the storage pool meet the rebalancing target. In response to determining that the plurality of storage devices do not meet the rebalancing target, a source storage device is selected for restriping. A destination storage device is selected for restriping. One or more data slices from the source storage device are transferred to the destination storage device. The selecting of source storage devices, destination storage devices, and transferring of one or more data slices are iteratively repeated until the plurality of storage devices meet the rebalancing target.

One or more of the following example features may be included. A storage capacity for the new storage device may be determined to be greater than a storage capacity of a prime storage device. In response to determining that the storage capacity for the new storage device is greater than the storage capacity of the prime storage device, the new storage device may be assigned as the prime storage device. Selecting the source storage device may include selecting a storage device with a utilization that deviates most from the rebalancing target compared to the other storage devices from the plurality of storage devices of the storage pool. Selecting the destination storage device may include: generating a list of storage devices that have a utilization below the rebalancing target; sorting the list of storage devices using a neighborhood matrix indicating a connectivity strength between each pair of storage devices of the storage pool; and selecting the storage device with a lowest connectivity strength with the source storage device. A restriping target of reserved data slices is generated for the storage pool. In response to determining that the plurality of storage devices meet the rebalancing target, reserved data slices may be rebalanced until each storage device meets the restriping target of reserved data slices. The plurality of used data slices and reserved data slices may be restriped into the plurality of data slice stripes using the initial layout and the restriping target.

In another example implementation, a computer program product resides on a computer readable medium that has a plurality of instructions stored on it. When executed by a processor, the instructions cause the processor to perform operations that may include, but are not limited to, detecting the addition of a new storage device to a storage pool. A rebalancing target is generated for the storage pool including the new storage device by simulating an initial layout of used data slices and reserved data slices into a plurality of data slice stripes. It is determined whether the plurality of storage devices of the storage pool meet the rebalancing target. In response to determining that the plurality of storage devices do not meet the rebalancing target, a source storage device is selected for restriping. A destination storage device is selected for restriping. One or more data slices from the source storage device are transferred to the destination storage device. The selecting of source storage devices, destination storage devices, and transferring of one or more data slices are iteratively repeated until the plurality of storage devices meet the rebalancing target.

One or more of the following example features may be included. A storage capacity for the new storage device may be determined to be greater than a storage capacity of a prime storage device. In response to determining that the storage capacity for the new storage device is greater than the storage capacity of the prime storage device, the new storage device may be assigned as the prime storage device. Selecting the source storage device may include selecting a storage device with a utilization that deviates most from the rebalancing target compared to the other storage devices from the plurality of storage devices of the storage pool. Selecting the destination storage device may include: generating a list of storage devices that have a utilization below the rebalancing target; sorting the list of storage devices using a neighborhood matrix indicating a connectivity strength between each pair of storage devices of the storage pool; and selecting the storage device with a lowest connectivity strength with the source storage device. A restriping target of reserved data slices is generated for the storage pool. In response to determining that the plurality of storage devices meet the rebalancing target, reserved data slices may be rebalanced until each storage device meets the restriping target of reserved data slices. The plurality of used data slices and reserved data slices may be restriped into the plurality of data slice stripes using the initial layout and the restriping target.

In another example implementation, a computing system includes at least one processor and at least one memory architecture coupled with the at least one processor, wherein the at least one processor is configured to detect the addition of a new storage device to a storage pool. A rebalancing target is generated for the storage pool including the new storage device by simulating an initial layout of used data slices and reserved data slices into a plurality of data slice stripes. It is determined whether the plurality of storage devices of the storage pool meet the rebalancing target. In response to determining that the plurality of storage devices do not meet the rebalancing target, a source storage device is selected for restriping. A destination storage device is selected for restriping. One or more data slices from the source storage device are transferred to the destination storage device. The selecting of source storage devices, destination storage devices, and transferring of one or more data slices are iteratively repeated until the plurality of storage devices meet the rebalancing target.

One or more of the following example features may be included. A storage capacity for the new storage device may be determined to be greater than a storage capacity of a prime storage device. In response to determining that the storage capacity for the new storage device is greater than the storage capacity of the prime storage device, the new storage device may be assigned as the prime storage device. Selecting the source storage device may include selecting a storage device with a utilization that deviates most from the rebalancing target compared to the other storage devices from the plurality of storage devices of the storage pool. Selecting the destination storage device may include: generating a list of storage devices that have a utilization below the rebalancing target; sorting the list of storage devices using a neighborhood matrix indicating a connectivity strength between each pair of storage devices of the storage pool; and selecting the storage device with a lowest connectivity strength with the source storage device. A restriping target of reserved data slices is generated for the storage pool. In response to determining that the plurality of storage devices meet the rebalancing target, reserved data slices may be rebalanced until each storage device meets the restriping target of reserved data slices. The plurality of used data slices and reserved data slices may be restriped into the plurality of data slice stripes using the initial layout and the restriping target.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
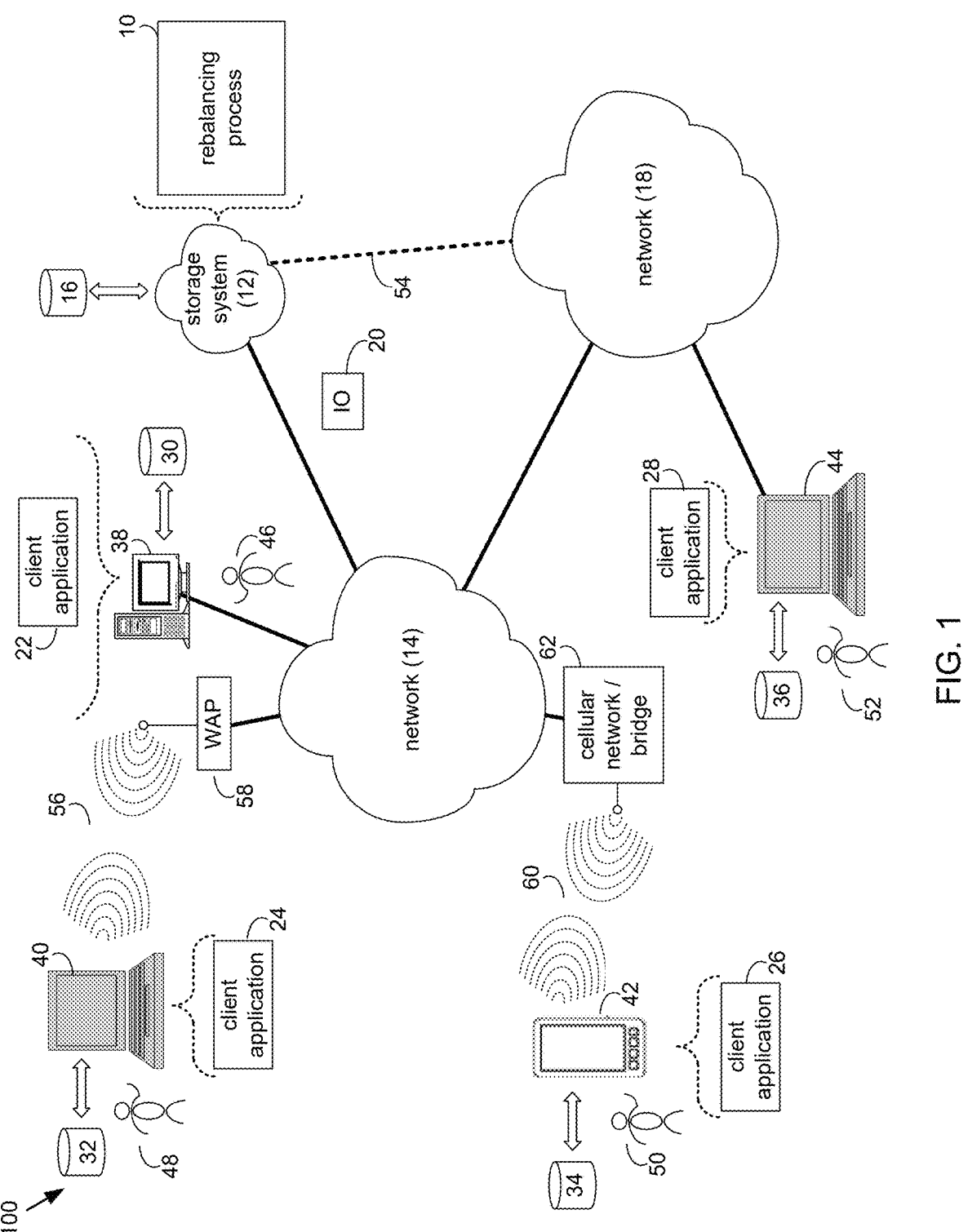
FIG. 1 is an example diagrammatic view of a storage system and a rebalancing process coupled to a distributed computing network according to one or more example implementations of the disclosure.

Referring to FIG. 1, there is shown rebalancing process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a minicomputer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of rebalancing process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random-access memory (RAM); a read-only memory (ROM); and all forms of flash memory storage devices. Additionally/alternatively, some portions of the instruction sets and subroutines of rebalancing process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a rebalancing process, such as rebalancing process 10 of FIG. 1, may include but is not limited to, detecting the addition of a new storage device to a storage pool. A rebalancing target is generated for the storage pool including the new storage device by simulating an initial layout of used data slices and reserved data slices into a plurality of data slice stripes. It is determined whether the plurality of storage devices of the storage pool meet the rebalancing target. In response to determining that the plurality of storage devices do not meet the rebalancing target, a source storage device is selected for restriping. A destination storage device is selected for restriping. One or more data slices from the source storage device are transferred to the destination storage device. The selecting of source storage devices, destination storage devices, and transferring of one or more data slices are iteratively repeated until the plurality of storage devices meet the rebalancing target.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
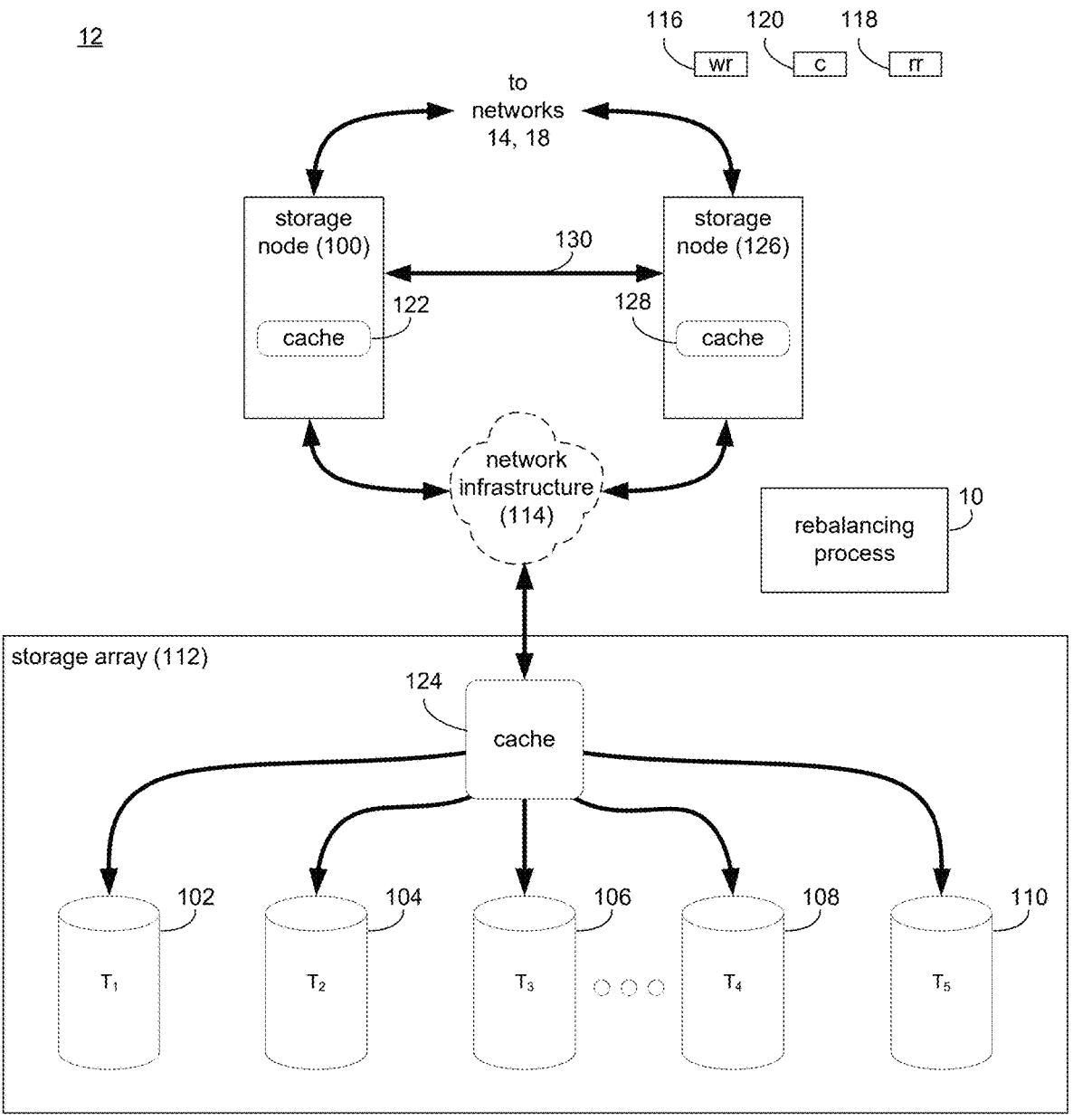
FIG. 2 is an example diagrammatic view of the storage system of FIG. 1 according to one or more example implementations of the disclosure.
Figure 3:
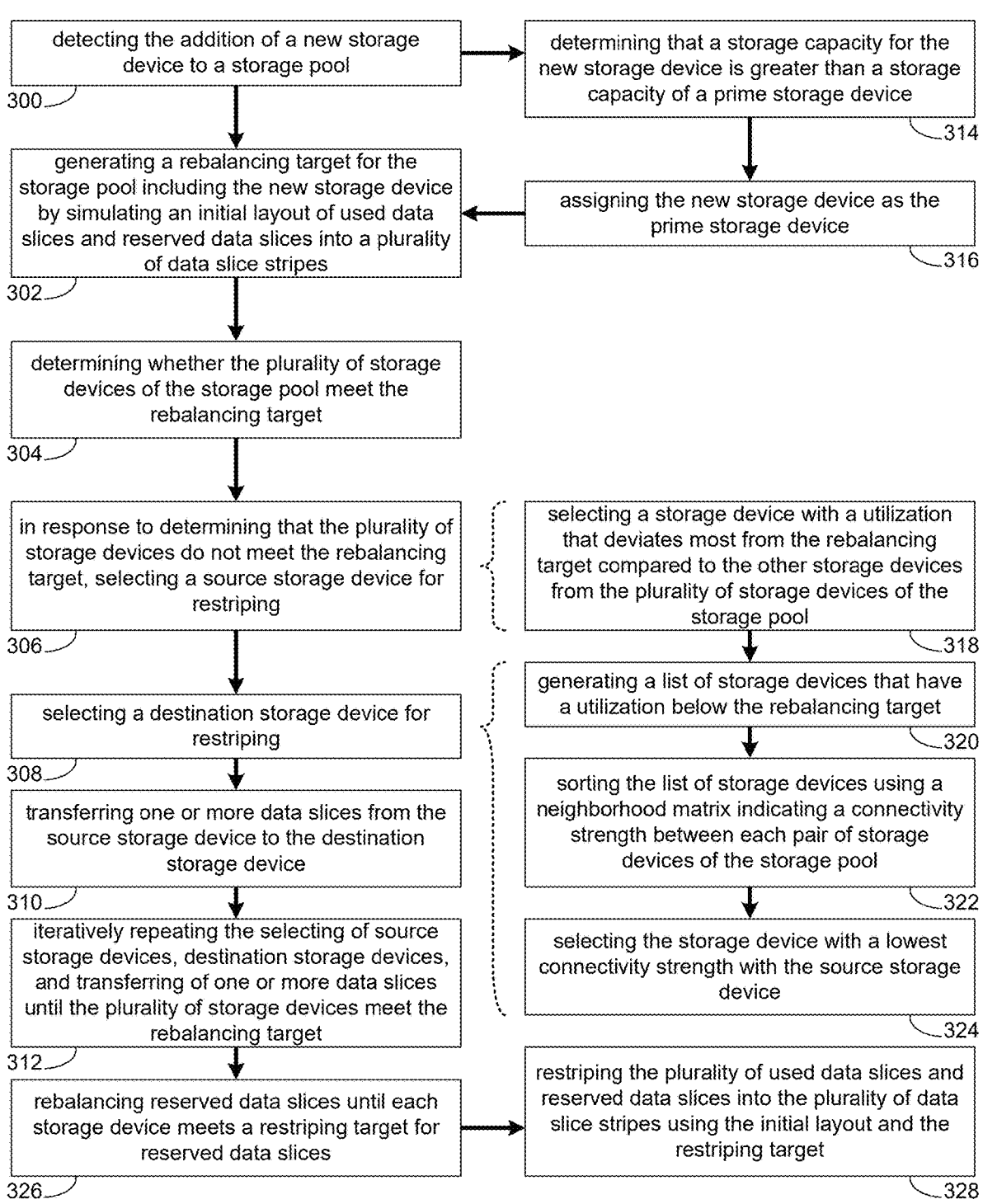
FIG. 3 is an example flowchart of the rebalancing process of FIG. 1 according to one or more example implementations of the disclosure.

The Storage System:

Referring also to FIG. 2, storage system 12 may include storage node 100 and a plurality of storage targets T 1-*n* (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g., storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g., the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g., the level of redundancy/performance/capacity required. For example, storage system 12 may be a RAID device in which storage node 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage node 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage node 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of rebalancing process 10. The instruction sets and subroutines of rebalancing process 10, which may be stored on a storage device (e.g., storage device 16) coupled to storage node 100, may be executed by one or more processors (not shown) and one or more memory architectures (not shown) included within storage node 100. Storage device 16 may include but is not limited to: a hard disk drive; a tape drive; an optical drive; a RAID device; a random-access memory (RAM); a read-only memory (ROM); and all forms of flash memory storage devices. As discussed above, some portions of the instruction sets and subroutines of rebalancing process 10 may be stored on storage devices (and/or executed by processors and memory architectures) that are external to storage system 12.

As discussed above, various IO requests (e.g., IO request 20) may be generated. For example, these IO requests may be sent from client applications 22, 24, 26, 28 to storage system 12. Additionally/alternatively and when storage node 100 is configured as an application server, these IO requests may be internally generated within storage node 100. Examples of IO request 20 may include but are not limited to data write request 116 (e.g., a request that content 118 be written to storage system 12) and data read request 120 (i.e., a request that content 118 be read from storage system 12).

During operation of storage node 100, content 118 to be written to storage system 12 may be processed by storage node 100. Additionally/alternatively and when storage node 100 is configured as an application server, content 118 to be written to storage system 12 may be internally generated by storage node 100.

Storage node 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage node 100 may initially store content 118 within frontend cache memory system 122. Depending upon the manner in which frontend cache memory system 122 is configured, storage node 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage node 100. Data array 112 may initially store content 118 within backend cache memory system 124 prior to being stored on e.g., one or more of storage targets 102, 104, 106, 108, and coded target 110.

As discussed above, the instruction sets and subroutines of rebalancing process 10, which may be stored on storage device 16 included within storage system 12, may be executed by one or more processors (not shown) and one or more memory architectures (not shown) included within storage system 12. Accordingly, in addition to being executed on storage node 100, some or all of the instruction sets and subroutines of rebalancing process 10 may be executed by one or more processors (not shown) and one or more memory architectures (not shown) included within data array 112.

Further and as discussed above, during the operation of data array 112, content (e.g., content 118) to be written to data array 112 may be received from storage node 100 and initially stored within backend cache memory system 124 prior to being stored on e.g., one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage nodes 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage node 126 may function like storage node 100. For example, during operation of storage node 126, content 118 to be written to storage system 12 may be processed by storage node 126. Additionally/alternatively and when storage node 126 is configured as an application server, content 118 to be written to storage system 12 may be internally generated by storage node 126.

Storage node 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage node 126 may initially store content 118 within frontend cache memory system 126. Depending upon the manner in which frontend cache memory system 128 is configured, storage node 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of rebalancing process 10, which may be stored on storage device 16 included within storage system 12, may be executed by one or more processors (not shown) and one or more memory architectures (not shown) included within storage system 12. Accordingly, in addition to being executed on storage node 126, some or all of the instruction sets and subroutines of rebalancing process 10 may be executed by one or more processors (not shown) and one or more memory architectures (not shown) included within data array 112.

Further and as discussed above, during the operation of data array 112, content (e.g., content 118) to be written to data array 112 may be received from storage node 126 and initially stored within backend cache memory system 124 prior to being stored on e.g., one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage node 100 and storage node 126 may be configured in an active/active configuration where processing of data by one storage node may be synchronized to the other storage node. For example, data may be synchronized between each storage node via a separate link or connection (e.g., connection 130).

The Rebalancing Process:

Referring also to FIGS. 3-8 and in some implementations, rebalancing process 10 detects 300 the addition of a new storage device to a storage pool. A rebalancing target is generated 302 for the storage pool including the new storage device by simulating an initial layout of used data slices and reserved data slices into a plurality of data slice stripes. It is determined 304 whether the plurality of storage devices of the storage pool meet the rebalancing target. In response to determining that the plurality of storage devices do not meet the rebalancing target, a source storage device is selected 306 for restriping. A destination storage device is selected 308 for restriping. One or more data slices from the source storage device are transferred 310 to the destination storage device. The selecting of source storage devices, destination storage devices, and transferring of one or more data slices are iteratively repeated 312 until the plurality of storage devices meet the rebalancing target.

Figure 4:
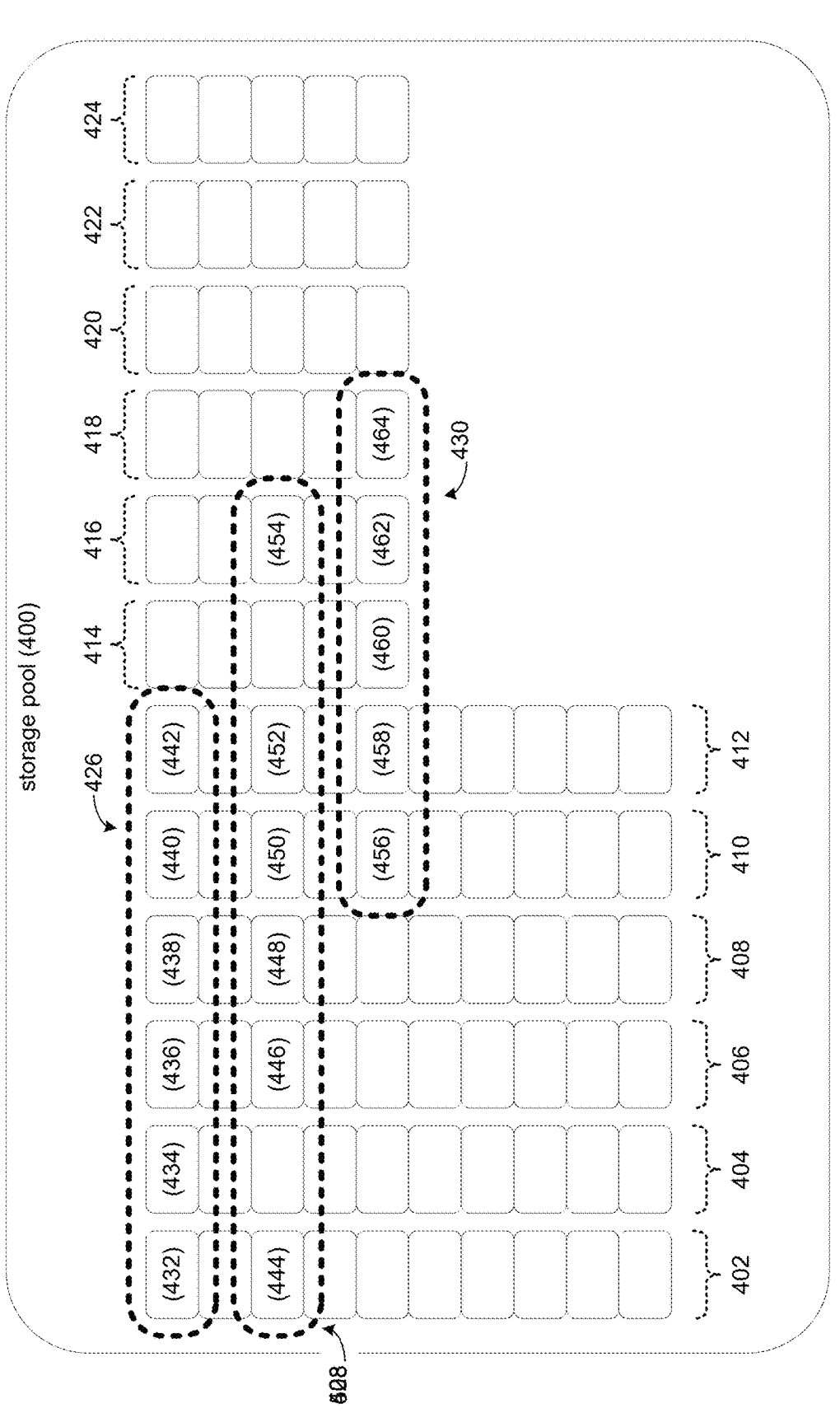
FIGS. 4-9 are example diagrammatic views of the rebalancing process of FIG. 3 according to one or more example implementations of the disclosure.

Referring also to FIG. 4, a storage pool (e.g., storage pool 400) includes a plurality of storage devices (e.g., storage devices 402, 404, 406, 408, 410, 412, 414, 416, 418, 420, 422, 424) including various storage capacities for storing data. As discussed above, storage devices 402, 404, 406, 408, 410, 412, 414, 416, 418, 420, 422, 424 may include electro-mechanical hard disk drives and/or solid-state/flash devices. In some implementations, storage devices 402, 404, 406, 408, 410, 412, 414, 416, 418, 420, 422, 424 each include a plurality of data slices that represent discrete portions of the total storage capacity of each storage device. Respective data slices are striped into multiple data slice stripes to provide fault tolerance and improved performance. For example, the striping process involves dividing data into portions and spreading these portions across the various data slices of multiple storage devices. Parity portions are interspersed with the data portions, ensuring that each storage device contains both data and parity information. This configuration not only enhances read performance by allowing simultaneous access to multiple storage devices but also provides redundancy, as the parity can be used to rebuild data if one storage device fails. Such striping configurations are known as RAID data striping. In some implementations, certain data slices are maintained as "reserved" for rebuilding failed storage devices. Storage pool 400 includes unused data slices, reserved data slices, and used data slices. As will be discussed in greater detail below, allocating sufficient reserved data slices can be difficult when storage devices vary in size.

In some implementations, storage devices of varying sizes may be combined into storage pool 400. In one example and as shown in FIG. 4, storage pool 400 includes six 4 terabyte (4 TB) storage devices (e.g., storage devices 402, 404, 406, 408, 410, 412) and six two terabyte (2 TB) storage devices (e.g., storage devices 414, 416, 418, 420, 422, 424). In this example, suppose that storage pool 400 is a "4+1 RAID-5" striping configuration where four storage devices are used for data storage and one storage device is used for parity. However, with the larger storage devices (e.g., storage devices 402, 404, 406, 408, 410, 412) and insufficient reserved storage space, a failed storage device may be unrecoverable. For example, suppose storage device 404 fails. In this example, there may be insufficient reserved space across this smaller storage devices (e.g., storage devices 414, 416, 418, 420, 422, 424). As such, various striping and balancing algorithms may be employed to allocate predefined amounts of reserved storage space.

In one example, larger storage devices are defined as a "prime storage device". The data slices of prime storage devices are organized into prime data slice stripes, where prime data slice stripes include an extra data slice compared to data slice stripes. As shown in FIG. 4, data slice stripes 426, 428, 430 are generated using the storage devices of storage pool 400. In this example, data slice stripes 426, 428 are prime data slice stripes with data slices 432, 434, 436, 438, 440, 442 across storage devices 402, 404, 406, 408, 410, 412 and data slices 444, 446, 448, 450, 452, 454 across storage devices 402, 406, 408, 410, 412, 416. As these are prime data slices, prime data slices 426, 428 include six data slices (e.g., five data slices for RAID-5 plus an extra data slice for the prime data slice). By contrast, a "normal" data slice stripe (e.g., data slice stripe 430) is formed with five data slices (e.g., data slices 456, 458, 460, 462, 464) across storage devices 410, 412, 414, 416, 418 per RAID-5.

Figure 5:
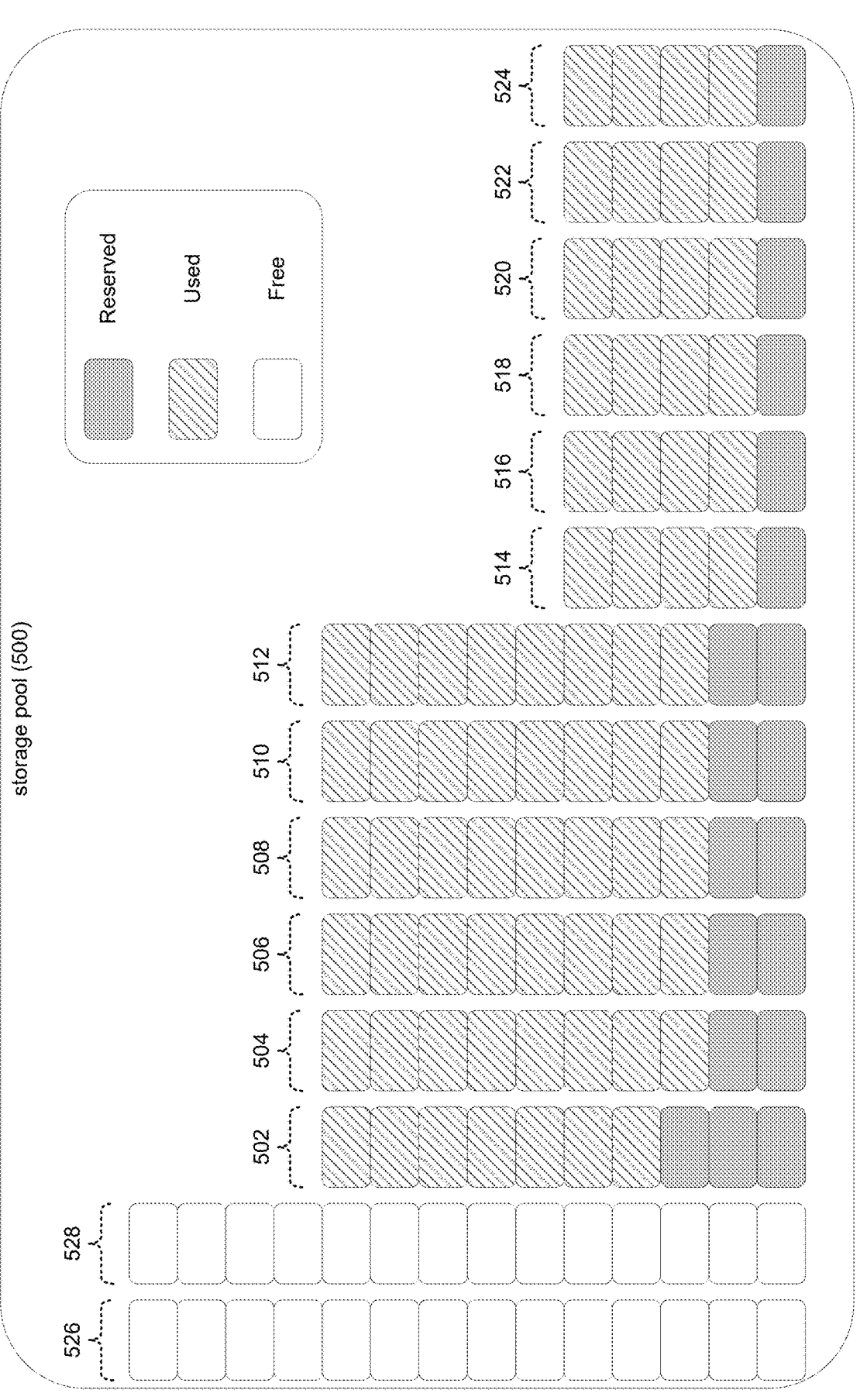

In some implementations, rebalancing process 10 detects 300 the addition of a new storage device to a storage pool. For example, storage pool 400 may be expanded by a user to include additionally storage devices. Referring also to FIG. 5, suppose storage pool 500 includes a plurality of storage devices (e.g., storage devices 502, 504, 506, 508, 510, 512, 514, 516, 518, 520, 522, 524) that are striped into a plurality of data slice stripes as described above. In this example, the plurality of storage devices (e.g., storage devices 502, 504, 506, 508, 510, 512, 514, 516, 518, 520, 522, 524) include a plurality of used data slices and a plurality of reserved data slices. As described above, the amount of data slices that are available for storing data and the number of data slices that are reserved are defined during striping of the plurality of data slices. In this example, two storage devices (e.g., storage devices 526, 528) are added to storage pool 500. Rebalancing process 10 may detect 300 the addition of storage devices 526, 528 in response to a change in the total capacity of storage pool 500 and/or in response to receiving and processing a request to add new storage devices to storage pool 500.

In some implementations, rebalancing process 10 determines 314 that a storage capacity for the new storage device is greater than a storage capacity of a prime storage device. For example and as shown in FIG. 5, storage devices 526, 528 have a storage capacity that exceeds that of an existing prime storage device (e.g., prime storage device 502). While this example includes a single prime storage device, it will be appreciated that any number of prime storage devices may be used within a storage pool within the present disclosure. In this example, rebalancing process 10 determines that storage device 526 has a storage capacity that is greater than the storage capacity of the prime storage device (e.g., prime storage device 502) by comparing the storage capacity of prime storage device 502 to new storage device 526. As shown in FIG. 4, storage device 526 has a greater storage capacity than prime storage device 502. Accordingly, rebalancing process 10 determines 314 that new storage device 526 has a storage capacity greater than prime storage device 502.

In some implementations and in response to determining 314 that the storage capacity for the new storage device is greater than the storage capacity of the prime storage device, rebalancing process 10 assigns 316 the new storage device as the prime storage device. For example, in response to determining that new storage device 526 has a storage capacity that is greater than the storage capacity of prime storage device 502, rebalancing process 10 assigns 316 new storage device 526 as the prime storage device for storage pool 500. As discussed above, the prime storage device is assigned an extra data slice during restriping. Accordingly, rebalancing process 10 assigns 316 an extra data slice to new storage device 526 as the new prime storage device.

In some implementations, rebalancing process 10 generates 302 a rebalancing target for the storage pool including the new storage device by simulating an initial layout of used data slices and reserved data slices into a plurality of data slice stripes. In some implementations, a rebalancing target is a target level of utilization of each storage device within the storage pool. For example, the rebalancing target may be a threshold percentage of utilization for storage devices of the storage pool after rebalancing. In one example, suppose a utilization of storage devices of a storage pool is 60% before a new storage device is detected. In this example, rebalancing process 10 uses one rebalancing algorithm to target e.g., 45% utilization of both storage devices. In another example using another rebalancing algorithm, rebalancing process 10 targets a certain utilization (e.g., 60%) for new storage devices and another utilization (e.g., 40%) for existing storage devices. However, it will be appreciated that various rebalancing targets may be used within the present disclosure.

Figure 6:
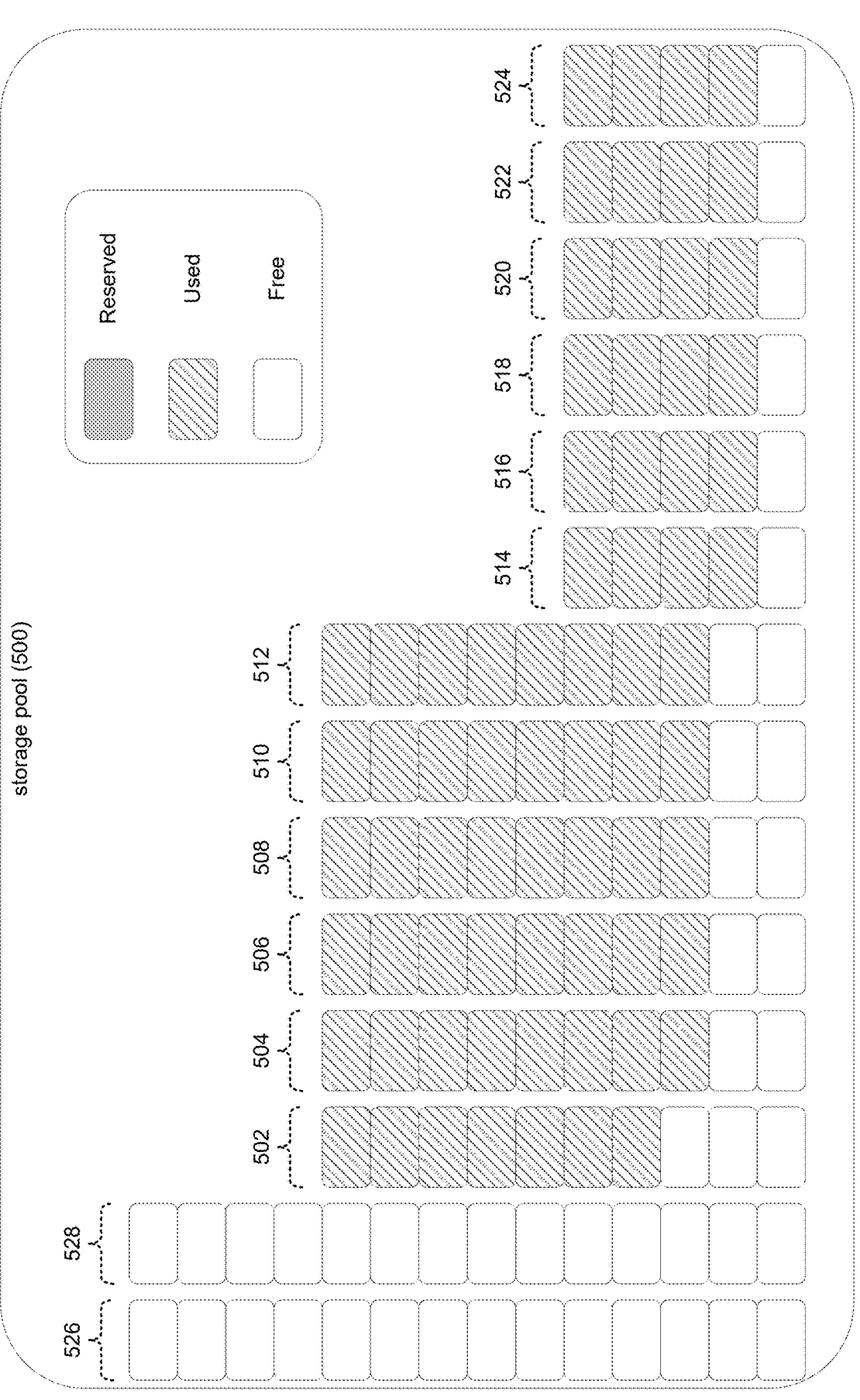

In some implementations, rebalancing process 10 generates a restriping target of reserved data slices for the storage pool. A restriping target is a number or percentage of reserved data slices for each data slice stripe. For example, the restriping target may be a predefined number of reserved data slices or a predefined percentage of reserved data slices for the storage pool after rebalancing. Referring also to FIG. 6, storage pool 500 is shown without the assignment of reserved data slices across the plurality of storage devices. Rebalancing process 10 rebalances and restripes the data slices across the storage pool by determining how to utilize each storage device in terms of used data slices and a number of reserved data slices for each data slice stripe. In some implementations, rebalancing process 10 simulates an initial layout of used data slices and reserved data slices into the plurality of data slice stripes that achieve the rebalancing target for the updated storage pool including the new storage device(s).

Figure 7:
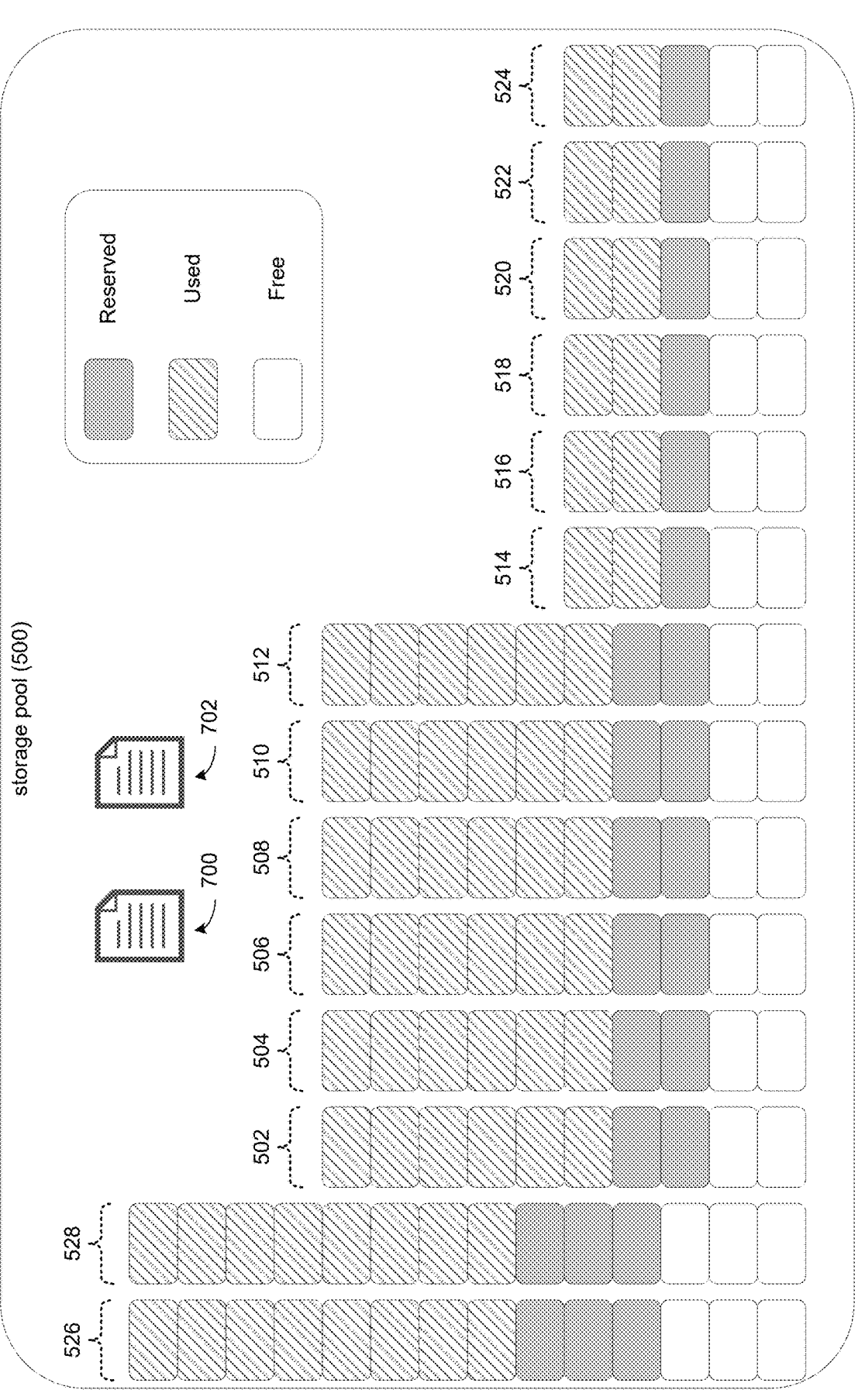
Figure 8:
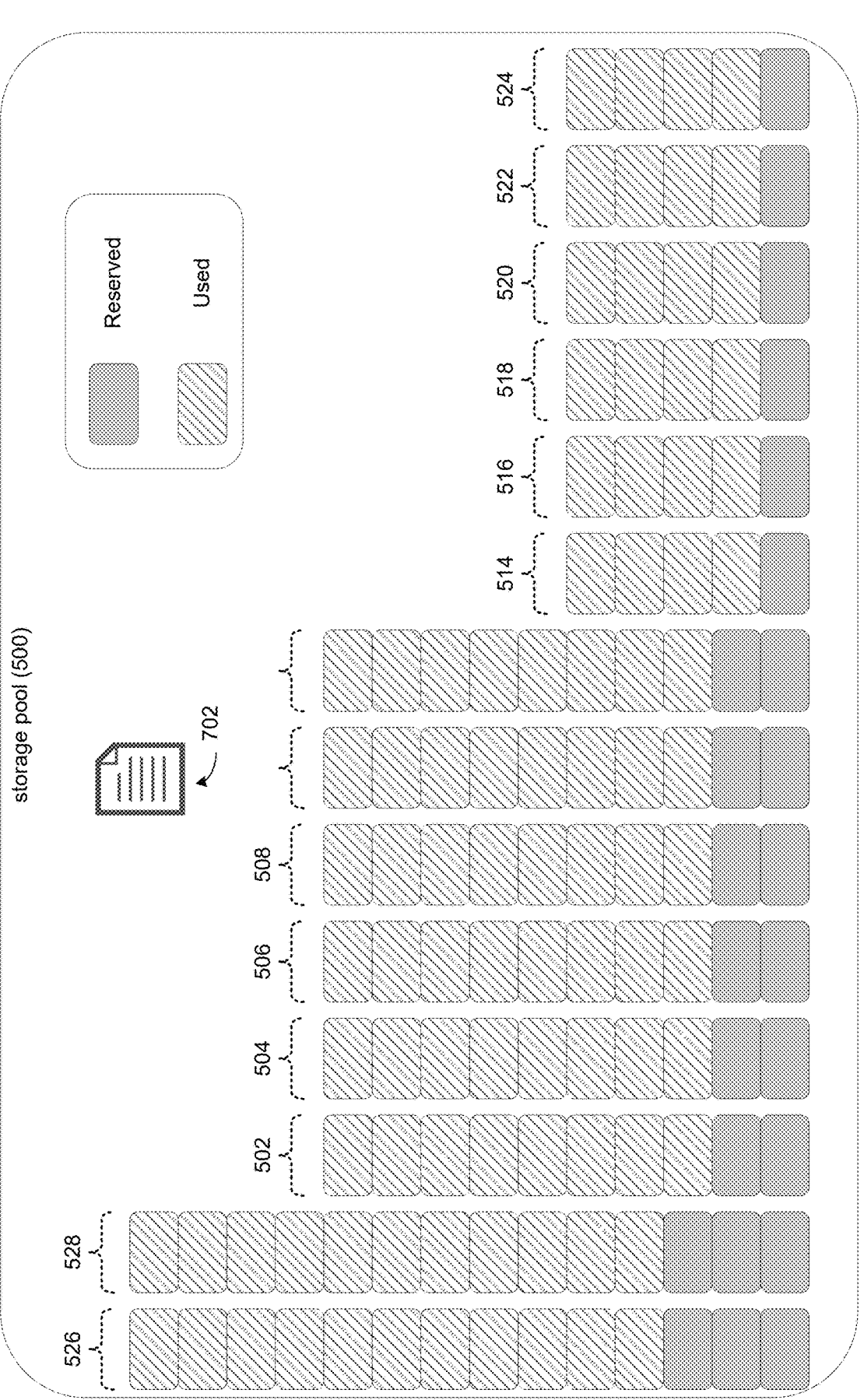

Referring also to FIG. 7, rebalancing process 10 simulates the initial layout for storage pool 500 including new storage devices 526, 528 with the same number of data slice stripes in storage pool 500 prior to the addition of new storage devices. In this example, rebalancing process 10 simulates a number of used data slices and reserved data slices using the number of data slice stripes prior to the addition of storage devices 526, 528. As shown in FIG. 7, each of the storage devices includes "free" or "unused" data slices that are unutilized. Accordingly, rebalancing process 10 uses the simulation of the initial layout to determine a number of data slices and the number of reserved data slices for each storage device.

In some implementations, rebalancing process 10 determines 304 whether the plurality of storage devices of the storage pool meet the rebalancing target. For example, rebalancing process 10 determines the utilization of each storage device to determine whether the plurality of storage devices meet the rebalancing target. In this example, rebalancing process 10 compares the utilization of each storage device to the rebalancing target to determine whether the plurality of storage devices of the storage pool meet the rebalancing target.

In some implementations and in response to determining that the plurality of storage devices do not meet the rebalancing target, rebalancing process 10 selects 306 a source storage device for restriping. For example, when the rebalancing target is not met, the utilization of each of the plurality of storage devices is imbalanced such that data slice stripes cannot be defined using the current allocation of data slices. Accordingly, rebalancing process 10 determines a source storage device for restriping (i.e., for transferring between a source storage device to a destination storage device for generating new data slice stripes) based upon, at least in part, the utilization of each storage device. In some implementations, selecting 306 the source storage device includes selecting 318 a storage device with a utilization that deviates most from the rebalancing target compared to the other storage devices from the plurality of storage devices of the storage pool. For example, rebalancing process 10 determines the utilization of each storage device in storage pool 500 and determines which storage device deviates the most from the rebalancing targe compared to the other storage devices of the storage pool. In some implementations, as storage devices include used data slices and free data slices, rebalancing process 10 rebalances data slices from a source storage device to a destination storage device such that the source storage device's utilization approaches the rebalancing target. In one example, the source storage device is a storage device with a higher utilization than the rebalancing target. As such and in this example, rebalancing process 10 transfers used data slices to a less utilized destination storage device.

In some implementations, rebalancing process 10 selects 308 a destination storage device for restriping. For example, when the rebalancing target is not met, the utilization of each of the plurality of storage devices is imbalanced such that data slice stripes cannot be defined using the current allocation of data slices with destination storage devices that have an insufficient utilization. Accordingly, rebalancing process 10 determines a destination storage device for restriping (i.e., for transferring between a source storage device to a destination storage device for generating new data slice stripes) based upon, at least in part, the utilization of each storage device. In some implementations, selecting 308 the destination storage device includes: generating 320 a list of storage devices that have a utilization below the rebalancing target; sorting 322 the list of storage devices using a neighborhood matrix indicating a connectivity strength between each pair of storage devices of the storage pool; and selecting 324 the storage device with a lowest connectivity strength with the source storage device. For example, rebalancing process 10 determines the utilization of each storage device in storage pool 500 and generates a list of storage devices that have a utilization below the rebalancing target. Referring also to FIG. 7, rebalancing process 10 generates 320 list 700 of storage devices that have a utilization below the rebalancing target.

In some implementations, rebalancing process 10 sorts 322 list 700 using a neighborhood matrix (e.g., neighborhood matrix 702) indicating a "connectivity strength" between each pair of storage devices of storage pool 500. Connectivity strength, as defined in neighborhood matrix 702, is a measurement of the number of data slice stripes with data slices from a respective pair of storage devices. For example, suppose storage device 502 and storage device 508 provide data slices that are in a set of e.g., ten data slice stripes. In this example, the connectivity strength is defined based upon the ten data slice stripes. In another example, suppose storage device 526 and storage device 508 data slices that are in a set of e.g., zero data slice stripes. In this example, the connectivity strength is defined based upon the zero data slice stripes. Accordingly, rebalancing process 10 uses the neighborhood matrix of connectivity strength values to select 324 the storage device with the lowest connectivity strength with the source storage device. Continuing with the above example, rebalancing process 10 selects storage device 526 as the destination storage device because of the lowest connectivity strength between storage device 526 and storage device 508.

In some implementations, rebalancing process 10 transfers 310 one or more data slices from the source storage device to the destination storage device. For example, rebalancing process 10 rebalances data slices from the source storage device to the destination storage device by transferring 310 data slices such that both the source storage device's utilization and the destination storage device's utilization approach the rebalancing target. Continuing with the above example, rebalancing process 10 transfers 310 a data slice (or any number of data slices) from storage device 508 to storage device 526.

In some implementations, rebalancing process 10 iteratively repeats 312 the selecting of source storage devices, destination storage devices, and transferring of one or more data slices until the plurality of storage devices meet the rebalancing target. For example, after transferring a data slice to storage device 526 from storage device 508, rebalancing process 10 determines 304 whether the plurality of storage devices of the storage pool meet the rebalancing target. If not, rebalancing process 10 iteratively repeats 312 the selecting of source storage devices, destination storage devices, and transferring of one or more data slices until the plurality of storage devices meet the rebalancing target.

In some implementations and in response to determining that the plurality of storage devices meet the rebalancing target, rebalancing process 10 rebalances 326 reserved data slices until each storage device meets the restriping target for reserved data slices. For example, the above description of transferring data slices generally concerns transferring used data slices between source and target storage devices. However, when rebalancing process 10 determines that the plurality of storage devices meet the rebalancing target, rebalancing process 10 rebalances 326 reserved data slices until each storage device meets the restriping target for reserved data slices. For example, rebalancing process 10 rebalances 326 the reserved data slices between storage devices until the restriping target is met.

In some implementations, rebalancing process 10 restripes 328 the plurality of used data slices and reserved data slices into the plurality of data slice stripes using the initial layout and the restriping target. For example and referring also to FIG. 8, rebalancing process 10 uses the rebalanced used data slices and reserved data slices within storage pool 500 to restripe the data slices into a plurality of data slice stripes. In this manner, rebalancing process 10 generates data slice stripes that include the added data slices from the new storage devices (e.g., new storage devices 526, 528).

Figure 9:
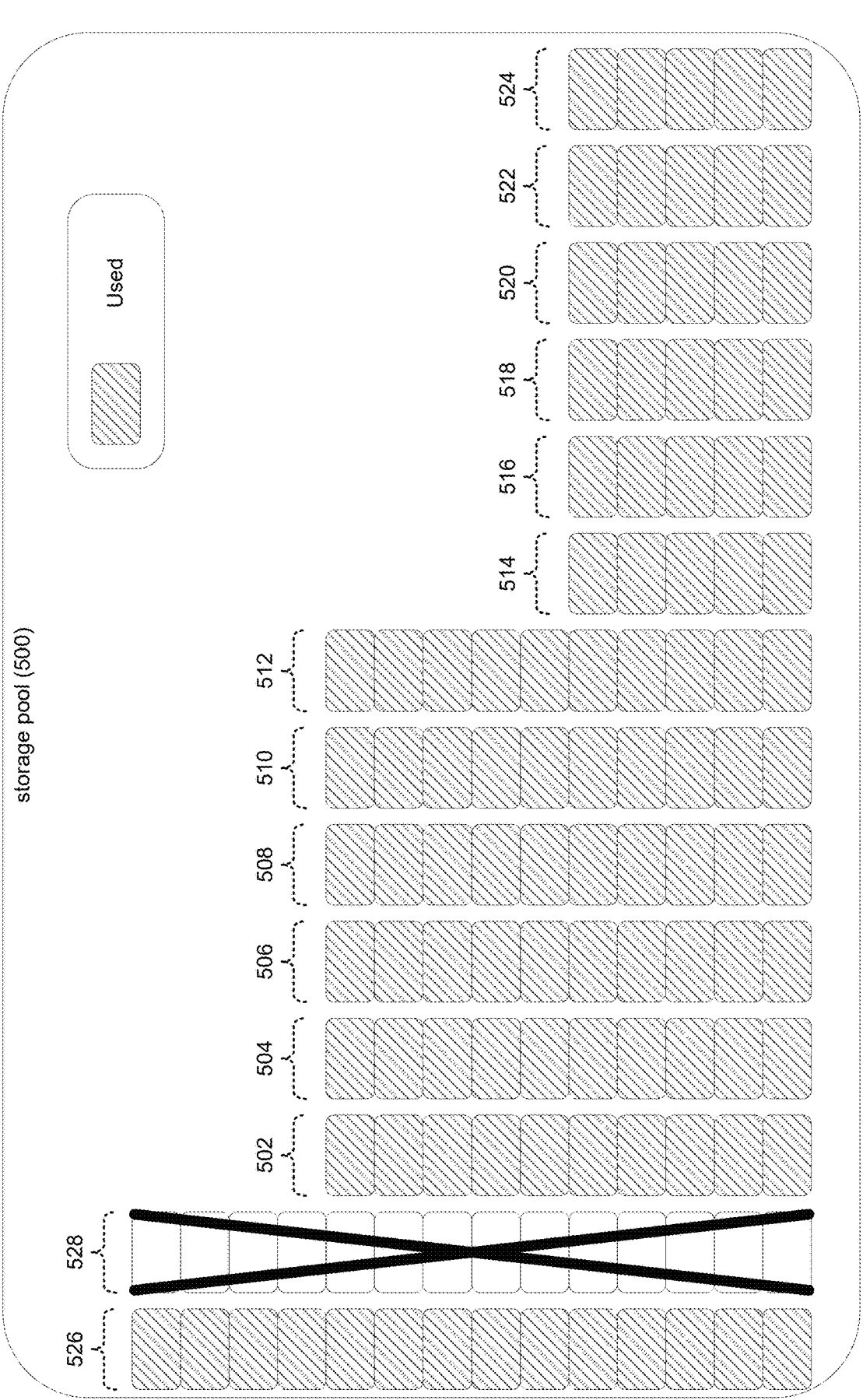

Referring also to FIG. 9 and in some implementations, rebalancing process 10 uses the restriped data slices of storage pool 500 to respond to subsequent issues with storage devices. For example, suppose storage device 528 fails. In this example, rebalancing process 10 uses the plurality of data slice stripes to rebuild the data slices from storage device 528. As newly added storage device 528 is larger than several of the other storage devices, rebalancing process 10 is rebalanced and restriped with a plurality of data slice stripes that account for the failure of any storage device within storage pool 500.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A and B" (and the like) as well as "at least one of A or B" (and the like) should be interpreted as covering only A, only B, or both A and B, unless the context clearly indicates otherwise. The language "one or more of A and B" (and the like) as well as "one or more of A or B" (and the like) should be interpreted as covering only A, only B, or both A and B, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:

detecting the addition of a new storage device to a storage pool;

generating a rebalancing target for the storage pool including the new storage device by simulating an initial layout of used data slices and reserved data slices into a plurality of data slice stripes;

determining whether the plurality of storage devices of the storage pool meet the rebalancing target;

in response to determining that the plurality of storage devices do not meet the rebalancing target, selecting a source storage device for restriping;

selecting a destination storage device for restriping;

transferring one or more data slices from the source storage device to the destination storage device; and iteratively repeating the selecting of source storage devices, destination storage devices, and transferring of one or more data slices until the plurality of storage devices meet the rebalancing target.

2. The computer-implemented method of claim 1, further comprising:

determining that a storage capacity for the new storage device is greater than a storage capacity of a prime storage device.

3. The computer-implemented method of claim 1, further comprising:

in response to determining that the storage capacity for the new storage device is greater than the storage capacity of the prime storage device, assigning the new storage device as the prime storage device.

4. The computer-implemented method of claim 1, wherein selecting the source storage device includes selecting a storage device with a utilization that deviates most from the rebalancing target compared to the other storage devices from the plurality of storage devices of the storage pool.

5. The computer implemented method of claim 4, wherein selecting the destination storage device includes:

generating a list of storage devices that have a utilization below the rebalancing target;

sorting the list of storage devices using a neighborhood matrix indicating a connectivity strength between each pair of storage devices of the storage pool; and selecting the storage device with a lowest connectivity strength with the source storage device.

6. The computer implemented method of claim 1, further comprising:

generating a restriping target of reserved data slices for the storage pool; and in response to determining that the plurality of storage devices meet the rebalancing target, rebalancing reserved data slices until each storage device meets the restriping target of reserved data slices.

7. The computer implemented method of claim 1, further comprising:

restriping the plurality of used data slices and reserved data slices into the plurality of data slice stripes using the initial layout and the restriping target.

8. A computer program product residing on a non-transitory computer readable medium having a plurality of instructions stored thereon which, when executed by a processor, cause the processor to perform operations comprising:

detecting the addition of a new storage device to a storage pool;

generating a rebalancing target for the storage pool including the new storage device by simulating an initial layout of used data slices and reserved data slices into a plurality of data slice stripes;

determining whether the plurality of storage devices of the storage pool meet the rebalancing target;

in response to determining that the plurality of storage devices do not meet the rebalancing target, selecting a source storage device for restriping;

selecting a destination storage device for restriping;

transferring one or more data slices from the source storage device to the destination storage device; and iteratively repeating the selecting of source storage devices, destination storage devices, and transferring of one or more data slices until the plurality of storage devices meet the rebalancing target.

9. The computer program product of claim 8, wherein the operations further comprise:

determining that a storage capacity for the new storage device is greater than a storage capacity of a prime storage device.

10. The computer program product of claim 8, wherein the operations further comprise:

in response to determining that the storage capacity for the new storage device is greater than the storage capacity of the prime storage device, assigning the new storage device as the prime storage device.

11. The computer program product of claim 8, wherein selecting the source storage device includes selecting a storage device with a utilization that deviates most from the rebalancing target compared to the other storage devices from the plurality of storage devices of the storage pool.

12. The computer program product of claim 11, wherein selecting the destination storage device includes:

generating a list of storage devices that have a utilization below the rebalancing target;

sorting the list of storage devices using a neighborhood matrix indicating a connectivity strength between each pair of storage devices of the storage pool; and selecting the storage device with a lowest connectivity strength with the source storage device.

13. The computer program product of claim 8, wherein the operations further comprise:

generating a restriping target of reserved data slices for the storage pool; and in response to determining that the plurality of storage devices meet the rebalancing target, rebalancing reserved data slices until each storage device meets the restriping target of reserved data slices.

14. The computer program product of claim 8, wherein the operations further comprise:

restriping the plurality of used data slices and reserved data slices into the plurality of data slice stripes using the initial layout and the restriping target.

15. A computing system comprising:

a memory; and a processor configured to detect the addition of a new storage device to a storage pool, to generate a rebalancing target for the storage pool including the new storage device by simulating an initial layout of used data slices and reserved data slices into a plurality of data slice stripes, to determine whether the plurality of storage devices of the storage pool meet the rebalancing target, in response to determining that the plurality of storage devices do not meet the rebalancing target, to select a source storage device for restriping, to select a destination storage device for restriping, to transfer one or more data slices from the source storage device to the destination storage device, and to iteratively repeat the selecting of source storage devices, destination storage devices, and transferring of one or more data slices until the plurality of storage devices meet the rebalancing target.

16. The computing system of claim 15, wherein the processor is further configured to:

determine that a storage capacity for the new storage device is greater than a storage capacity of a prime storage device.

17. The computing system of claim 15, wherein the processor is further configured to:

in response to determining that the storage capacity for the new storage device is greater than the storage capacity of the prime storage device, assign the new storage device as the prime storage device.

18. The computing system of claim 15, wherein selecting the source storage device includes selecting a storage device with a utilization that deviates most from the rebalancing target compared to the other storage devices from the plurality of storage devices of the storage pool.

19. The computing system of claim 18, wherein selecting the destination storage device includes:

generating a list of storage devices that have a utilization below the rebalancing target;

sorting the list of storage devices using a neighborhood matrix indicating a connectivity strength between each pair of storage devices of the storage pool; and selecting the storage device with a lowest connectivity strength with the source storage device.

20. The computing system of claim 15, wherein the processor is further configured to:

generate a restriping target of reserved data slices for the storage pool; and in response to determining that the plurality of storage devices meet the rebalancing target, rebalance reserved data slices until each storage device meets the restriping target of reserved data slices.

* * * * *